(12) United States Patent
Kilian et al.

(10) Patent No.: US 11,979,101 B2
(45) Date of Patent: May 7, 2024

(54) SENSOR-FREE COMMUTATION METHOD

(71) Applicant: ebm-papst Mulfingen GmbH & Co. KG, Mulfingen (DE)

(72) Inventors: Thomas Kilian, Krautheim (DE); Fabian Schneider, Rot am See (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 282 days.

(21) Appl. No.: 17/600,503

(22) PCT Filed: May 7, 2020

(86) PCT No.: PCT/EP2020/062759
§ 371 (c)(1),
(2) Date: Sep. 30, 2021

(87) PCT Pub. No.: WO2020/239385
PCT Pub. Date: Dec. 3, 2020

(65) Prior Publication Data
US 2022/0173673 A1     Jun. 2, 2022

(30) Foreign Application Priority Data

May 27, 2019   (DE) .................. 10 2019 114 073.0

(51) Int. Cl.
*H02P 1/46*      (2006.01)
*H02P 3/18*      (2006.01)
(Continued)

(52) U.S. Cl.
CPC ............... *H02P 1/465* (2013.01); *H02P 6/15* (2016.02); *H02P 6/18* (2013.01); *H02P 6/22* (2013.01); *H02P 6/26* (2016.02); *H02P 6/28* (2016.02)

(58) Field of Classification Search
CPC .... H02P 1/465; H02P 6/15; H02P 6/26; H02P 6/28; H02P 6/18; H02P 6/22
(Continued)

(56) References Cited

U.S. PATENT DOCUMENTS 3,551,778 A      12/1970   Ekstrom
8,988,021 B2 *   3/2015    Clothier ................. H02P 6/181
                                                          318/722
(Continued)

FOREIGN PATENT DOCUMENTS

CN      85109583 A      8/1986
CN      201001094 Y     1/2008
(Continued)

OTHER PUBLICATIONS

International Search Report and Written Opinion of the International Searching Authority, issued in PCT/EP2020/062759, dated Jul. 24, 2020; ISA/EP.
(Continued)

*Primary Examiner* — Erick D Glass
(74) *Attorney, Agent, or Firm* — Harness, Dickey & Pierce, P.L.C.

(57) ABSTRACT

A single-strand EC motor with a winding strand with two winding connections, has a current regulating device in the winding strands between the winding connections. The current regulating device regulates the winding current of the single-strand EC motor during a first commutation phase with a positive current flow and a second commutation phase with a negative current flow. In each case, at a constant value. The value of the average output voltage uw(t) of the current regulator is used to ascertain the commutation time.

14 Claims, 7 Drawing Sheets

(51) Int. Cl.
  *H02P 6/00* (2016.01)
  *H02P 6/15* (2016.01)
  *H02P 6/18* (2016.01)
  *H02P 6/22* (2006.01)
  *H02P 6/26* (2016.01)
  *H02P 6/28* (2016.01)

(58) Field of Classification Search
  USPC .......................................................... 318/700
  See application file for complete search history.

(56) References Cited

U.S. PATENT DOCUMENTS

| | | | | |
|---|---|---|---|---|
| 2006/0119300 | A1* | 6/2006 | Armstrong | H02P 6/10 318/400.04 |
| 2014/0000318 | A1 | 1/2014 | Hayashida | |
| 2017/0222580 | A1 | 8/2017 | Tsai | |
| 2018/0069494 | A1 | 3/2018 | Schneider | |
| 2018/0351495 | A1 | 12/2018 | Neber et al. | |
| 2021/0111655 | A1* | 4/2021 | Takayama | H02P 6/26 |

FOREIGN PATENT DOCUMENTS

| | | |
|---|---|---|
| CN | 101865146 A | 10/2010 |
| DE | 102006008601 A1 | 9/2006 |
| DE | 102005061404 A1 | 7/2007 |
| DE | 102006004313 A1 | 8/2007 |
| DE | 102011105913 A1 | 2/2012 |
| EP | 2 60 397 A2 | 3/1988 |
| EP | 1 596 495 A2 | 11/2005 |
| EP | 2 086 104 A2 | 8/2009 |
| EP | 3425788 A1 | 1/2019 |
| GB | 1287116 A | 8/1972 |

OTHER PUBLICATIONS

Search Report from copending German application DE 10 2019 114 228.8 dated May 27, 2019.

Chinese Search Report dated Oct. 27, 2023 in corresponding Chinese Application No. 2020800199837.

* cited by examiner

SENSOR-FREE COMMUTATION METHOD

CROSS-REFERENCE TO RELATED APPLICATIONS

This application is a 371 U.S. National Phase of International Application No. PCT/EP2020/062759, filed May 7, 2020, which claims priority to German Patent Application No. 10 2019 114 073.0, filed May 27, 2019. The entire disclosures of the above applications are incorporated herein by reference.

FIELD

The disclosure relates to a sensorless commutation method of a motor to a single-phase EC motor.

SUMMARY

Single-phase electronically commutated motors (ECMs) are comparatively inexpensive and are often used for particular drive tasks, e.g. for fans, blowers, or rotary pumps. They are usually controlled by means of a Hall sensor.

EP 2 086 104 A2 discloses an electronically commutated motor with an H-bridge and a rotor position sensor that generates an output signal. As a function of the output signal, the lower switch of the H-bridge is switched to a conductive state at a time t2'. The resulting electric circuit, the electrical energy is converted into mechanical energy so that at a time t3' or t1, depending on the output signal, a commutation can occur where no current or only a small amount of it flows through the winding. The time t2' is optimized through measurement and evaluation of the current flowing through the winding after the commutation.

In recent years, however, there has been an increasing demand for sensorless commutation. Basically, the following principles for sensorless commutation of a single-phase EC motor are known from the prior art:

Position sensorless commutation of a single-phase EC motor through model-based calculation of the synchronous internal voltage of the motor.

Position sensorless commutation of a single-phase EC motor through evaluation of the time curve of the winding current with the specification of a constant voltage amplitude.

Position sensorless commutation of a single-phase EC motor through direct evaluation of the synchronous internal voltage of the motor during a currentless phase (current gap).

To precisely define an EC motor, on the one hand, the number of stator current pulses per rotor rotation of 360° el. is indicated, e.g. one-pulse, two-pulse, three-pulse, etc. On the other hand, the number of phase windings is indicated in the stator, e.g. single-phase, two-phase, three-phase, etc.

Thus they are referred to as a single-phase, two-pulse ECM or a two-phase, two-pulse ECM, for example. In practice, there is basically no difference between these two motor types in terms of the physical function. Also, there is always a tendency to simplify the terminology. Thus, such motors are generally referred to as single-phase EC motors since they have only one phase winding per current pulse.

EP 2 60 397 A1 discloses an embodiment where first, the position of the current ridge and the current amplitude at the maximum of the current ridge are determined. Then the minimum of the current in the region of the current saddle is determined and also possibly its amplitude. If a passage through the minimum has occurred and a value for the magnitude of the current that should trigger a commutation procedure has been detected, then the commutation procedure is triggered when the motor current has reached or exceeded this calculated value. In this case, depending on the requirements, this current value that triggers the commutation procedure can be mathematically manipulated. This occurs in such a way that the commutation occurs late during the start-up and is shifted further and further in the early direction as the rotation speed increases.

Commutation without a rotor position sensor has the advantage that the electronics of the motor can also be positioned at a distance from the motor. Thus, components of the electronics can also be used for other tasks. For example, a microprocessor, used in the motor, can also be used for regulating tasks, e.g. for a temperature regulation. This also permits a smaller embodiment of the motor, if necessary.

Since in such motors, there are rotation positions of the rotor where the motor cannot produce any electromagnetic torque, an auxiliary torque is used. This is effective at the zero points. This can be a magnetically generated auxiliary torque, which is referred to as reluctance torque. Alternatively, this auxiliary torque could be mechanically generated by a spring. The spring is stressed in certain rotation positions and then releases its stored energy at the zero points. The function of this auxiliary torque is primarily to turn the rotor so that at the start, it is not in a rotation position where the motor cannot generate any electromagnetic torque since otherwise, the motor would not be able to start. Alternatively, asymmetries are used.

Such motors have a preferred rotation direction. An additional difficulty arises with blowers or pumps in that they can be "externally driven" by the transported medium, e.g. by air flows. Thus, it is not known whether this external drive will cause the rotor to rotate in the preferred direction or counter to it.

With powerful air currents, the rotation speed of the rotor can in fact be quite high. In a motor without a Hall sensor, it is necessary to first determine the rotation direction, and if it is incorrect, to reverse the motor.

EP 1 596 495 A2, for example, discloses detecting the rotation direction in such an EC motor with reluctance auxiliary torque based on the shape of the induced voltage. That is, based on the voltage that the rotating permanent-magnet rotor induces in a currentless phase winding.

It is an object of the disclosure to overcome the above-mentioned disadvantages and to propose an optimized and improved sensorless commutation method for a single-phase EC motor where a detection of the rotation direction is also possible. It is also desirable to enable starting of the EC motor in either rotation direction at will. In the preferred rotation direction and counter to it. Another object includes, in the case of an external drive, detecting information and breaking an EC motor.

The object is attained according to the disclosure by a single-phase EC motor having one phase winding with two winding connections. It comprises: a current-regulating device in the phase winding between the winding connections. The current regulation regulates the winding current of the single-phase EC motor to a constant.

One fundamental idea of the disclosure includes the fact that the position sensorless commutation of a single-phase EC motor carried out through the direct use of a current regulation. This current regulation (e.g. a two-point regulation) regulates the winding current of the single-phase motor to a magnitude that is partially constant during the two commutation phases (positive current flow, negative current flow). In this case, the magnitude of the average output voltage of this (two-point) current regulator, that is present between the two winding connections of the motor, is used to determine the commutation time, i.e. the change-over between the two commutation phases. This is carried out through simple comparison to a limit value. If the value falls below this limit value, then the change-over of the commutation phase is carried out. The limit value here can be selected to be proportional to the amplitude of the constant current (ohmic voltage drop). In this case, the commutation time corresponds to the time of the zero crossing of the synchronous internal voltage of the motor. The winding current and synchronous internal voltage are in phase and an optimized torque is generated. This corresponds to the commutation time of existing methods with direct detection of the synchronous internal voltage, but with the advantage that in the described method, it is not necessary to incorporate any current gaps. By using different limit values, it is possible to vary the commutation time. Thus, for example, it is advantages to achieve an advantageous precommutation. This compensates for the delayed reversal of the current flow in the motor winding at the commutation time that is caused by the winding inductance.

In an advantageous embodiment, the reversal of the current flow after a detected commutation time can not occur with maximal speed, but rather with a defined rate of change (e.g. through specification of a ramp function at the input of the current regulator). It is thus possible to achieve a further improvement with regard to the noise emission, particularly in the case of axial fans.

It is also advantageous that the start-up of the motor from a stop is forced through a selective triggering of the change-over between the two commutation phases. This can be specified, for example, by a fixed time interval after whose expiration a forced change-over of the commutation phase is carried out. The rotor is thus set in motion and the further commutation is in turn carried out through feedback of the synchronous internal voltage to the output voltage of the (two-point) current regulator.

According to an advantageous embodiment of the present disclosure, an evaluation of the average slope of the magnitude of the output voltage of the (two-point) current regulator during a commutation phase is used to determine the rotation direction of the motor. Due to an asymmetry in the geometry of the motor, the average slope of the magnitude of the synchronous internal voltage is dependent on the rotation direction of the rotor. This is reflected directly in the curve of the output voltage of the (two-point) current regulator. A slope of the magnitude that is positive on average during a commutation phase can thus be defined as a positive rotation direction. Conversely, a slope of the magnitude that is negative on average can be defined as a negative rotation direction. Consequently, when a positive desired rotation direction is needed, an unwanted negative actual rotation direction can be detected and reacted to in an appropriate way, for example, with braking and a subsequent restarting attempt.

The average output voltage of the (two-point) current regulator in this case is basically equivalent to the definition of a duty cycle. In other words, instead of detecting the average voltage at the winding connections, it is advantageously possible to use the duty cycle/duty factor of the triggering (on-time relative to the cycle duration or stated more precisely, on-time relative to the on-time+off-time). In an advantageous embodiment of the disclosure, this can also be the PWM duty cycle of a triggering by pulse-width modulation (PWM).

DRAWINGS

The drawings described herein are for illustrative purposes only of selected embodiments and not all possible implementations, and are not intended to limit the scope of the present disclosure.

Other advantageous modifications of the disclosure are disclosed in the dependent claims and will be described in greater detail below together with the description of the preferred embodiment based on the figures.

In the drawings.

DETAILED DESCRIPTION

With the exemplary embodiment shown, it is possible to spare the component and mounting costs of a Hall IC that would otherwise be required for rotor position detection. The elimination of the Hall IC also achieves degrees of freedom in the placement of the circuit board in the motor housing. The described method is essentially based on a bridge-triggering by f pulse-width modulation (PWM) in combination with a current regulator that constantly regulates the motor current by changing the PWM duty cycle. Based on the evaluation of the time curve of this PWM duty cycle, in addition to the detection of the commutation time, for other subtasks in the context of sensorless commutation, it is possible to achieve the commutation time. This includes of the change-over of the current supply pattern during normal operation, the rotation direction detection, an active braking, and a leveling-off detection. Thus, it is possible to determine the magnitude of leveling-off motions of the rotor, primarily in order to detect the progress of a rotor motion that is leveling off to a predetermined orientation position so as to shorten/minimize the necessary orientation time during start-up.

This method is enhanced by a parking function of the rotor. The parking function moves the rotor into the desired orientation position when the rotation speed desired value is taken away (after motor operation) or when the supply voltage is applied (before motor operation) in order to enable the subsequent motor start-up with a minimal delay (due to the orientation of the rotor). A sequence control or automatic operation control ensures the execution of the necessary steps during the start-up of the motor (braking, orientation with leveling-off detection, kick start in the preferred rotation direction or counter to it). Thus, it makes sure that the EC motor rotates in the desired rotation direction. If need be, independent start-up attempts are performed repeatedly.

Figure 1:
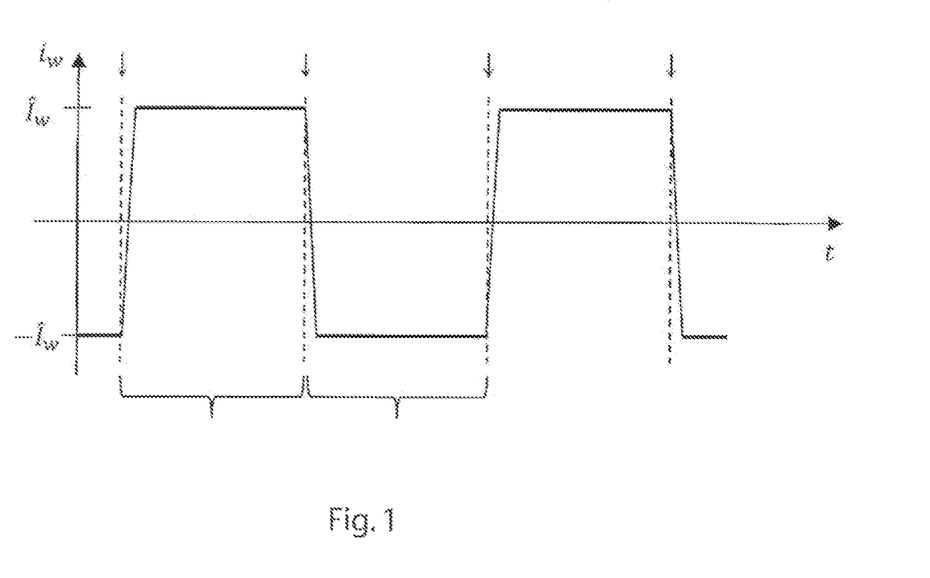
FIG. 1 is a schematic view of an exemplary constant current regulation with the commutation phases.

FIG. 1 shows an exemplary commutation of a single-phase EC motor with a constant current regulation with the two successive commutation phases A and B. In this case, the position sensorless commutation of the single-phase EC motor takes place through the use of a current regulation. This current regulation (e.g. a two-point regulation) regulates the winding current $i_w(t)$ of the EC motor. In the one (first) commutation phase A, power is supplied with a positive current flow. In the second commutation phase B, that respectively follows commutation phase A, power is supplied with a negative current flow. During the commutation phases A and B, the current flow is essentially constant in this case and corresponds to the value $\hat{i}_w$ and $-\hat{i}_w$, respectively. The arrows and the dashed line indicate the commutation time where the commutation electronics, or stated more precisely the current regulator, produces a change-over between the commutation phases A and B.

Figure 2:
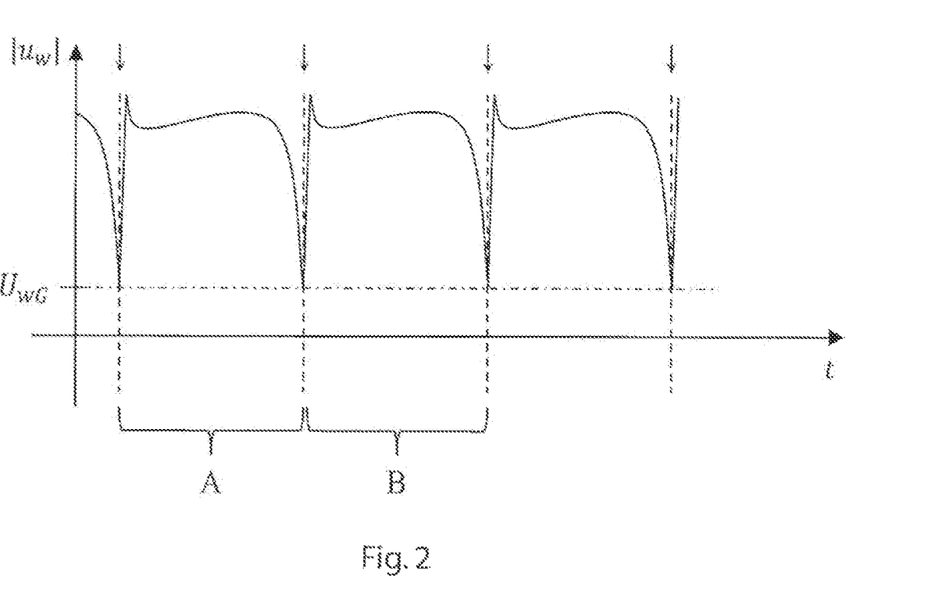
FIG. 2 is a schematic view of a function graph that depicts the magnitude of the average output voltage and the voltage limit value.

FIG. 2 shows a function graph that depicts the magnitude of the average output voltage $u_w(t)$ of a two-point current regulator and the voltage limit value $u_{WG}$. The magnitude of the average output voltage of this (two-point) current regulator is used in this case to determine the necessary commutation time, the change-over between the two commutation phases A and B. This is carried out by a simple comparison to the depicted voltage limit value $u_{WG}$.

The output voltage $u_w(t)$ falls at first and once it has fallen below the voltage limit value $u_{WG}$, the change-over of the commutation phase A to the commutation phase B is carried out and so forth. The voltage limit value $u_{WG}$ in this case can be chosen to be proportional to the amplitude of the constant current from FIG. 1 (ohmic voltage drop). The commutation time in this case corresponds to the time of the zero passage of the synchronous internal voltage.

Figure 3:
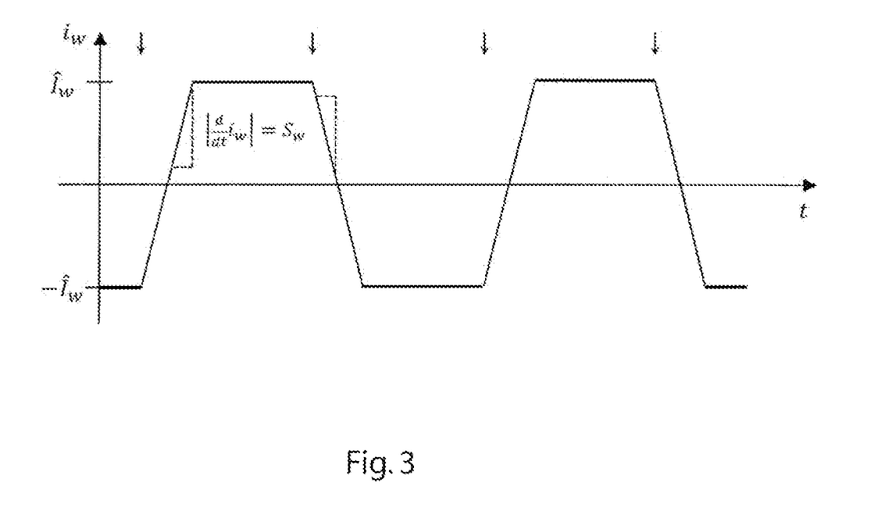
FIG. 3 is a schematic view of a function graph that depicts the preset current at the current regulator with a defined rate of change.

FIG. 3 shows a function graph that depicts the preset current at the current regulator with a defined rate of change in the time curve. By an intentionally different, i.e. deviating, voltage limit value $u_{WG}$, it is possible to vary the commutation time and thus, for example, achieve an advantageous precommutation. This then compensates for the delayed reversal of the current flow in the motor winding at the commutation time that is caused by the winding inductance. In FIG. 3, it is clear that the respective reversal of the current flow after a detected commutation time does not occur erratically or at maximum speed (as shown in FIG. 1), but instead along a ramp function with a defined rate of change $s_w$. $s_w$ indicates the time derivative and thus the average rate of change. This is determined by the time differential of the current $i_w$. Technically, this is achieved, for example, through specification of a ramp function at the input of the current regulator.

Figure 6:
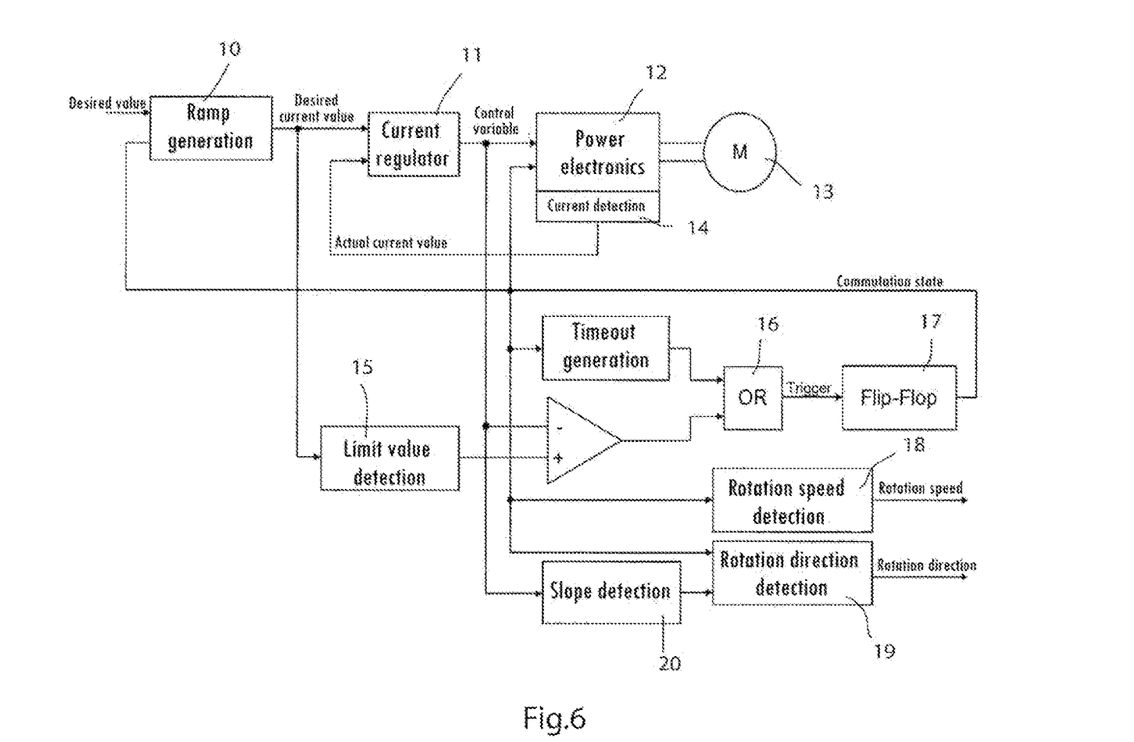
FIG. 6 is a schematic view of a block diagram of the commutation method.

FIG. 6 shows an exemplary block diagram of the commutation method. The ramp function is implemented via a ramp generation unit 10 by means of a desired value input "desired value". It is specified as a "desired current value" at the input of the current regulator 11. For this purpose, the current regulator 11 transmits a corresponding "control variable" to the power electronics 12 that are connected to the EC motor 13. The power electronics 12 also include a current detection device 14 in order to detect the "actual current value." This is sent to the current regulator 11 once again in order to adjust the "control variable" if need be.

The limit value is sent via the limit value detector 15 to a control logic circuit. with the commutation state at the input is sent to the ramp generation unit via an OR switch 16 and flip-flop 17. A rotation speed detector 18 and a rotation direction detector 19 are also provided. As is clear, the rotation direction detector 19 uses the magnitude of the time curve of the voltage and receives this from the slope detector 20.

Figure 4:
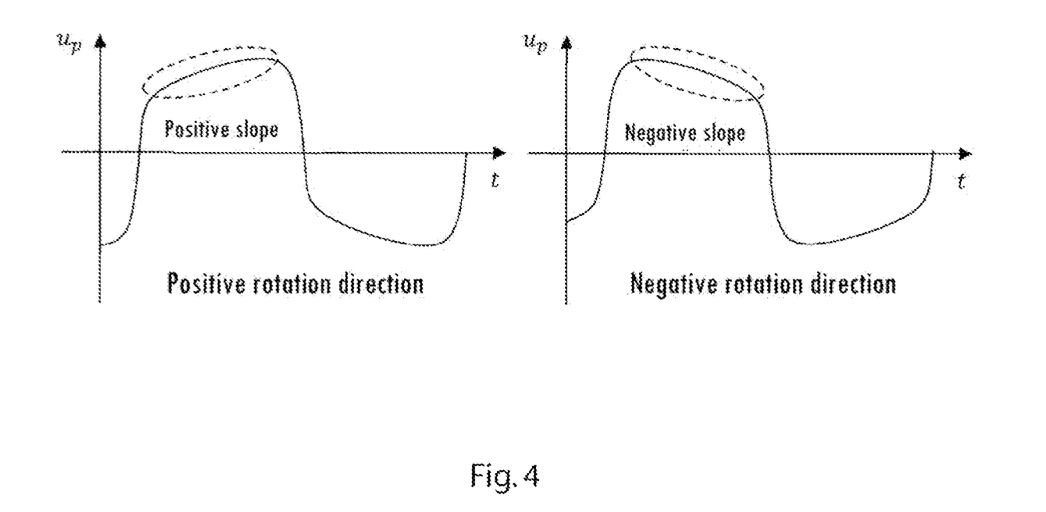
FIG. 4 is a schematic view of a time curve of the synchronous internal voltage with a positive and negative rotation direction of a single-phase EC motor with an asymmetrical design of the stator teeth.

FIG. 4 shows the time curve of the synchronous internal voltage with a positive and negative rotation direction of a single-phase EC motor with an asymmetrical design of the stator teeth. In this case, known asymmetrical concepts can be used where, for example, the air gap is not constant. Instead changes can be used in the circumference direction as a function of the tooth position of a winding tooth. Through an evaluation of the average slope of the magnitude of the synchronous internal voltage up of the two-point current regulator, it is possible, by taking advantage of the asymmetry during a commutation phase, to determine the rotation direction of the EC motor. This is due to the average slope of the magnitude of the synchronous internal voltage is dependent on the rotation direction of the rotor. With a positive slope, an increase in the synchronous internal voltage up as shown in the image on the left in FIG. 4, it is possible to infer the existence of a positive rotation direction. With a negative slope, a decrease in the synchronous internal voltage up as shown in the image on the right in FIG. 4, it is possible to infer the existence of a reverse, namely negative, rotation direction. The rotation direction can therefore be determined in a simple yet reliable way.

Figure 5:
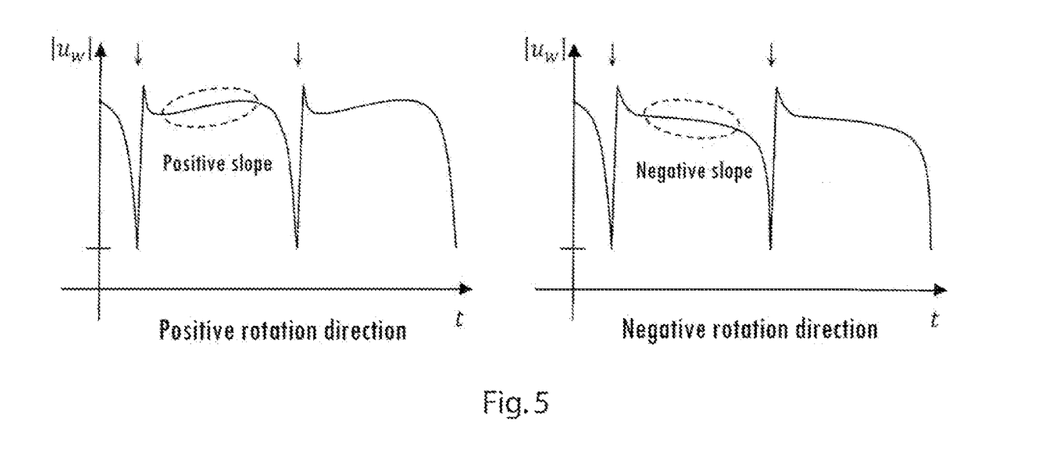
FIG. 5 is a schematic view of a time curve of the magnitude of the average output voltage with a positive and negative rotation direction of the EC motor.

Since this voltage curve is also directly reflected in the curve of the output voltage of the two-point current regulator as shown in FIG. 5, it is possible to correspondingly read the rotation direction from the change in the output voltage of the two-point current regulator. An on average positive slope of the magnitude $|u_w|$ during a commutation phase can therefore be defined as a positive rotation direction. An on average negative slope of the magnitude $|u_w|$ can conversely be evaluated as a negative rotation direction. Consequently, when a positive desired rotation direction is needed, a deviating negative actual rotation direction can be detected and reacted to in an appropriate way from a control standpoint, for example, with braking and a subsequent restarting attempt, as shown in the flowchart in FIG. 9.

Figure 7:
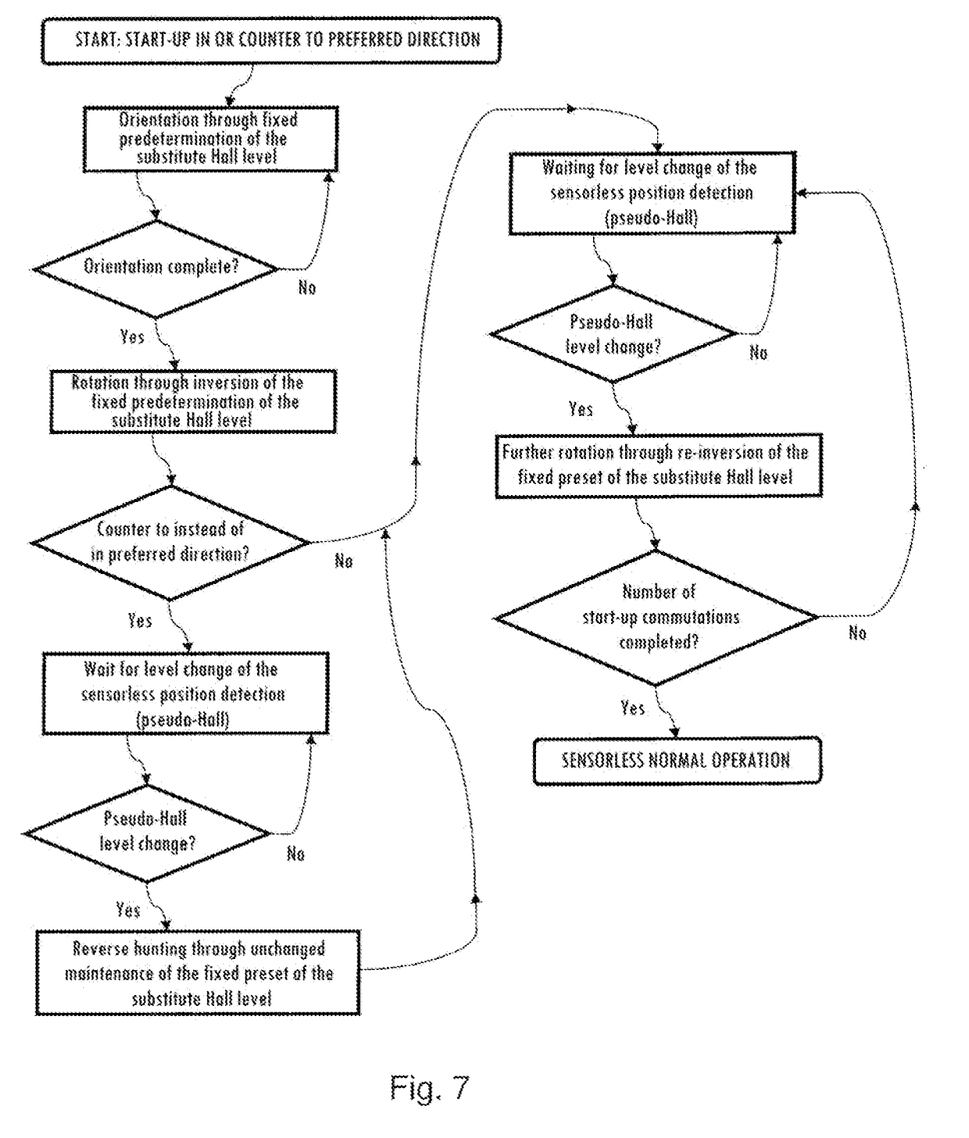
FIG. 7 is a schematic view of the flowchart: Start-up in a particular rotation direction.

FIG. 7 shows a flowchart for explaining the start-up of a single-phase EC motor in a particular rotation direction. In the motor start-up, first, the rotor is first oriented on a fixed starting position and then immediately started with the first sensorless commutation steps. No chronologically controlled acceleration with a fixed, predetermined rotating field ramp takes place. The pattern of the first commutation steps in this case differs slightly depending on the desired rotation direction. After the orientation of the rotor, the first forced commutation takes place through inversion of a pseudo-Hall signal a substitute Hall signal based on which the commutation is performed, whereby the rotor is set in motion (motor start). With the parameterization of the sensorless position detection that is optimized (through evaluation of the resulting PWM duty cycle of the current regulation) for the start-up (as opposed to normal operation), the first subsequent polarity change is already detected. With the start-up in the preferred rotation direction, with this first detected commutation time, the next power supply pattern is activated by changing the pseudo-Hall level, whereupon the rotor continues its rotating motion. After a fixed number of such commutations that are optimized for the start-up, the parameterization of the rotor position detection is finally changed to values for a normal operation and thus a switch is made into sensorless normal operation. With the start-up in the direction counter to the preferred rotation direction, with the first detected commutation time, a commutation is deliberately not performed and instead, the present power supply pattern is maintained. Thus as the rotor continues to rotate, a gradually more powerful torque, acting in the opposite direction, sets in. This brakes the rotor and in the end, sets it in motion in the opposite direction. What is shown is a rotor that is starting up from a stop, which, after the first inevitable start-up in the preferred direction, continues by running in the opposite direction by a leveling-off motion.

Figure 8:
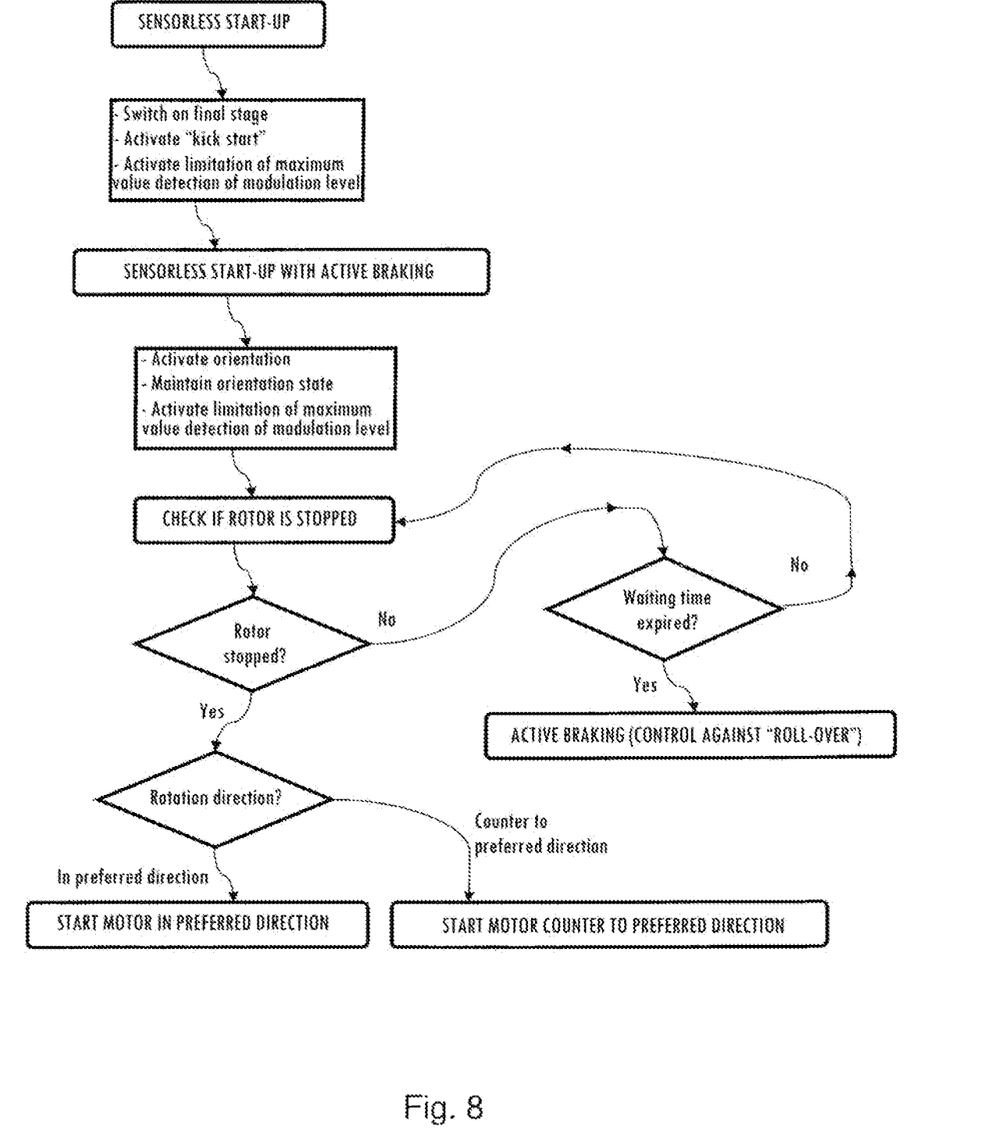
FIG. 8 is a schematic view of the flowchart: Preparation for sensorless start-up.

FIG. 8 shows a flowchart for explaining the preparation of a sensorless start-up, which at the end, is switched over into normal operation.

Figure 9:
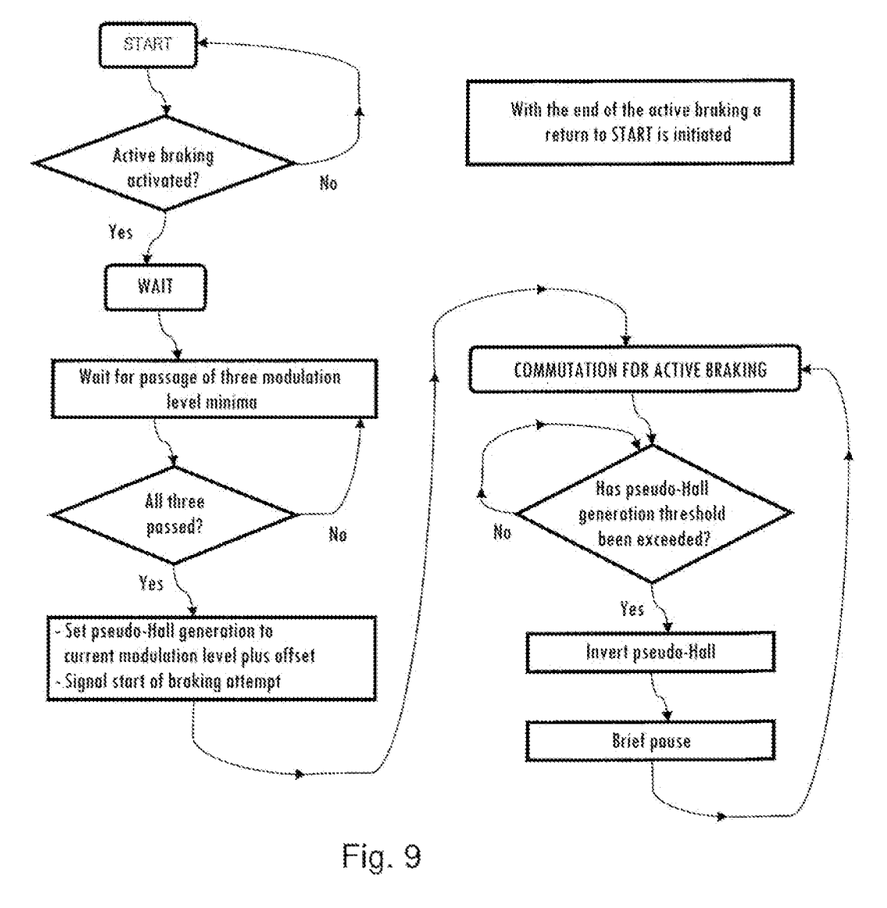
FIG. 9 is a schematic view of the flowchart: Active braking of the EC motor.

FIG. 9 shows a flowchart for explaining the active braking of the EC motor. The flowchart includes the following sub-functions, establishment of the settings of the sensorless position detection that are optimized for braking and generation of a substitute Hall signal for the commutation for active braking.

Figure 10:
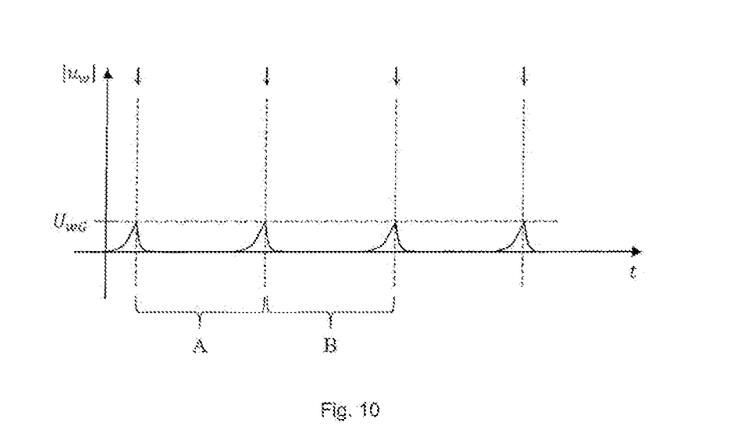
FIG. 10 is a schematic view of a function graph that depicts the magnitude of the average output voltage and the voltage limit value during active braking.

FIG. 10 shows a function graph that depicts the magnitude of the average output voltage $u_w(t)$ and the associated voltage limit value for the commutation during active braking. During active braking, the applied average voltage is in phase opposition to the polarity of the synchronous internal voltage that is induced in the motor winding. The current that the current regulator impresses into the winding is even achieved at an average voltage that is very low, comparatively speaking. Once a change in the polarity of the voltage induced in the motor occurs, the average output voltage of the current regulator begins to increase. This increase above the limit value $U_{WG}$ is used for the commutation.

Figure 11:
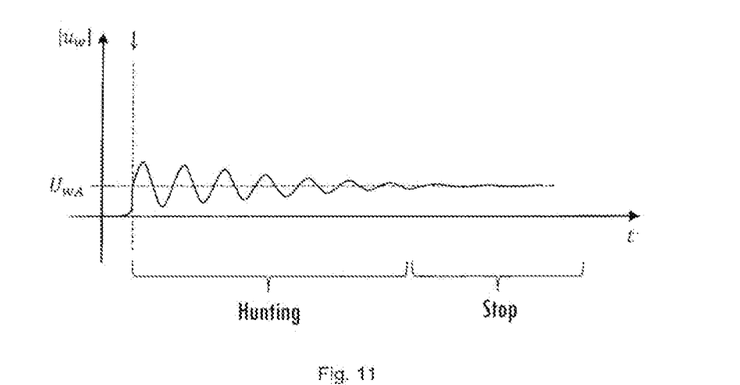
FIG. 11 is a schematic view of a function graph that depicts the magnitude of the average output voltage during orientation with a rotor that is leveling off.
Figure 12:
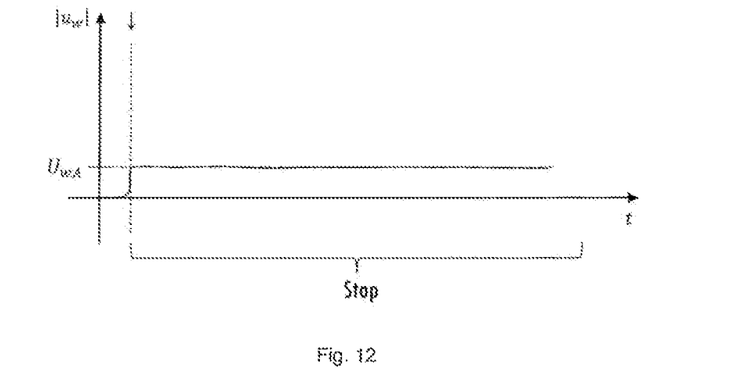
FIG. 12 is a schematic view of a a function graph that depicts the magnitude of the average output voltage during orientation with a rotor that is already correctly oriented.

FIGS. 11 and 12 each show a function graph that depicts the magnitude of the average output voltage $u_w(t)$ during the orientation of the rotor with a constant winding current that is predetermined by the current regulator. The orientation of the rotor and its virtually stopped state are basic requirements for the subsequent sensorless motor start (kick start). FIG. 11 shows the curve of the average output voltage $u_w(t)$ with a rotor that was not previously in the orientation home position, with the leveling-off motion of the rotor reflected in the curve. By evaluating the amplitude of the alternating portion that is superimposed on the idle level of $u_w(t)$ (referred to as $U_{wA}$), it is possible to infer the deflection of the leveling-off rotor motion from its stop position and thus to find the ideal earliest time for the transition from the orientation of the rotor to the motor start (kick start). In addition, from the instantaneous polarity of this superimposed alternating portion, it is possible to infer the instantaneous direction of the leveling-off motion. Thus, in an advantageous embodiment, it is possible for the motor start (kick start) to be triggered precisely at the moment when the instantaneous direction of the leveling-off motion coincides with the direction of the motor start that is to be performed. It is thus advantageously possible for the motor start to take place during the flow of the leveling-off motion even before the leveling-off rotor comes to a complete stop. Thus, this further shortens the time required for the orientation (minimized start-up delay). FIG. 12, by contrast, shows the curve of the average output voltage $u_w(t)$ with a rotor that is already in the orientation home position. Thus, no additional time has to be used for the orientation of the rotor and the motor start (kick start) can take place immediately. With this evaluation of the average output voltage $u_w(t)$, it is possible, even independently of different moments of inertia of different rotor mountings, to always find the earliest possible time for the transition from the orientation of the rotor to the motor start-up and thus to minimize the start-up delay.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A single-phase EC motor having one phase winding with two winding connections, comprising:
a current-regulating device in the phase winding between the winding connections, the current regulation regulates the winding current of the single-phase EC motor to a constant magnitude during a current regulation by the current regulator in the phase winding is carried out in such a way that during a first commutation phase (A), the phase winding is supplied with an essentially constant positive current flow and during a second subsequent commutation phase (B), the phase winding is supplied with an essentially constant negative current flow, and wherein the respective commutation time is determined using a magnitude of the average output voltage $u_w(t)$ of the current regulator; and
the determination of the respective commutation time is performed through a comparison of the average output voltage $u_w(t)$ of the current regulator to a predetermined voltage limit value $u_{WG}$ and the time where the voltage falls below a voltage limit value $u_{WG}$ is defined as a commutation time at which a change-over of the commutation phases (A, B) takes place.

2. The commutation method of a single-phase EC motor according to claim 1, wherein the voltage limit value $u_{WG}$ is selected to be proportional to the amplitude of the respective constant current during the commutation phases (A, B).

3. The commutation method of a single-phase EC motor according to claim 1, wherein the commutation time where a change-over from the first commutation phase (A) to the second commutation phase (B) occurs is the time that corresponds to a zero crossing of the synchronous internal voltage of the EC motor.

4. The commutation method according claim 1, wherein in order to achieve a particular precommutation angle, the commutation time is changed through an adaptation of the voltage limit value $u_{WG}$.

5. The commutation method according to claim 1, wherein the reversal of the current flow at the change-over of the commutation phases (A, B) at the commutation time does not occur erratically, but rather in accordance with a defined rate of change in that a ramp function is applied for this purpose at the input of the current regulator.

6. The commutation method according to claim 1, wherein first, the start-up of the EC motor from a stop is achieved through a selective triggering of the change-over between the first and second commutation phases (A, B) in such a way that after a predetermined time elapses, a change-over from the respective first commutation phase into the respective second commutation phase occurs in order to thus set the rotor into a rotating motion.

7. The commutation method according to claim 1, wherein through an evaluation of the average slope or of the time differential of the magnitude of the output voltage $u_w(t)$ of the current regulator during a commutation phase (A, B), the rotation direction of the EC motor is determined and in particular, an on average positive slope or positive sign of the differential of the magnitude during a commutation phase is defined as a positive rotation direction and in particular, an on average negative slope or negative sign of the differential of the magnitude during a commutation phase is defined as a negative rotation direction.

8. The commutation method according to claim 1, wherein in order to determine the commutation time, the PWM duty cycle of a triggering by means of pulse-width modulation (PWM) is used instead of the evaluation of the average output voltage $u_w(t)$ of the current regulator.

9. The commutation method according to 1, wherein the duration of the orientation of the rotor is shortened through evaluation of the time curve of the average output voltage of the current regulator, in particular through evaluation of the reflection of the leveling-off motion of the rotor in an oscillation superimposed on the average output voltage.

10. The commutation method according to claim 9, wherein based on the AC voltage, which is superimposed on the average output voltage of the current regulator and reflects the leveling-off motion of the rotor, it is possible to infer the direction of the instantaneous rotor leveling-off motion and as a result, the motor start-up can occur even before completion of the leveling-off of the rotor that is to be oriented and can occur synchronously to the leveling-off motion of the rotor.

11. The commutation method according to claim 1, wherein a rotor that is to be braked by active braking before the motor start-up is brought to a stop in such a way that through evaluation of the average output voltage of a current regulator that sets the motor current, commutation is carried out when a limit value is exceeded.

12. A single-phase EC motor having one phase winding with two winding connections, comprising:
   a current-regulating device in the phase winding between the winding connections, the current regulation regulates the winding current of the single-phase EC motor to a constant magnitude during both a first commutation phase, with a positive current flow, and a second commutation phase with a negative current flow, and the commutation time is determined using a magnitude of the average output voltage $u_w(t)$ of the current regulator;
   the duration of the orientation of the rotor is shortened through evaluation of the time curve of the average output voltage of the current regulator, in particular through evaluation of the reflection of the leveling-off motion of the rotor in an oscillation superimposed on the average output voltage.

13. A single-phase EC motor according to claim 12 wherein based on the AC voltage, which is superimposed on the average output voltage of the current regulator and reflects the leveling-off motion of the rotor, it is possible to infer the direction of the instantaneous rotor leveling-off motion and as a result, the motor start-up can occur even before completion of the leveling-off of the rotor that is to be oriented and can occur synchronously to the leveling-off motion of the rotor.

14. A single-phase EC motor having one phase winding with two winding connections, comprising:
   a current-regulating device in the phase winding between the winding connections, the current regulation regulates the winding current of the single-phase EC motor to a constant magnitude during both a first commutation phase, with a positive current flow, and a second commutation phase with a negative current flow, and the commutation time is determined using a magnitude of the average output voltage $u_w(t)$ of the current regulator; and
   a rotor that is to be braked by active braking before the motor start-up is brought to a stop in such a way that through evaluation of the average output voltage of a current regulator that sets the motor current, commutation is carried out when a limit value is exceeded.

* * * * *